Jan. 10, 1961  A. H. LAURIE  2,967,399
ARTIFICIAL BREAKWATERS
Filed July 12, 1957
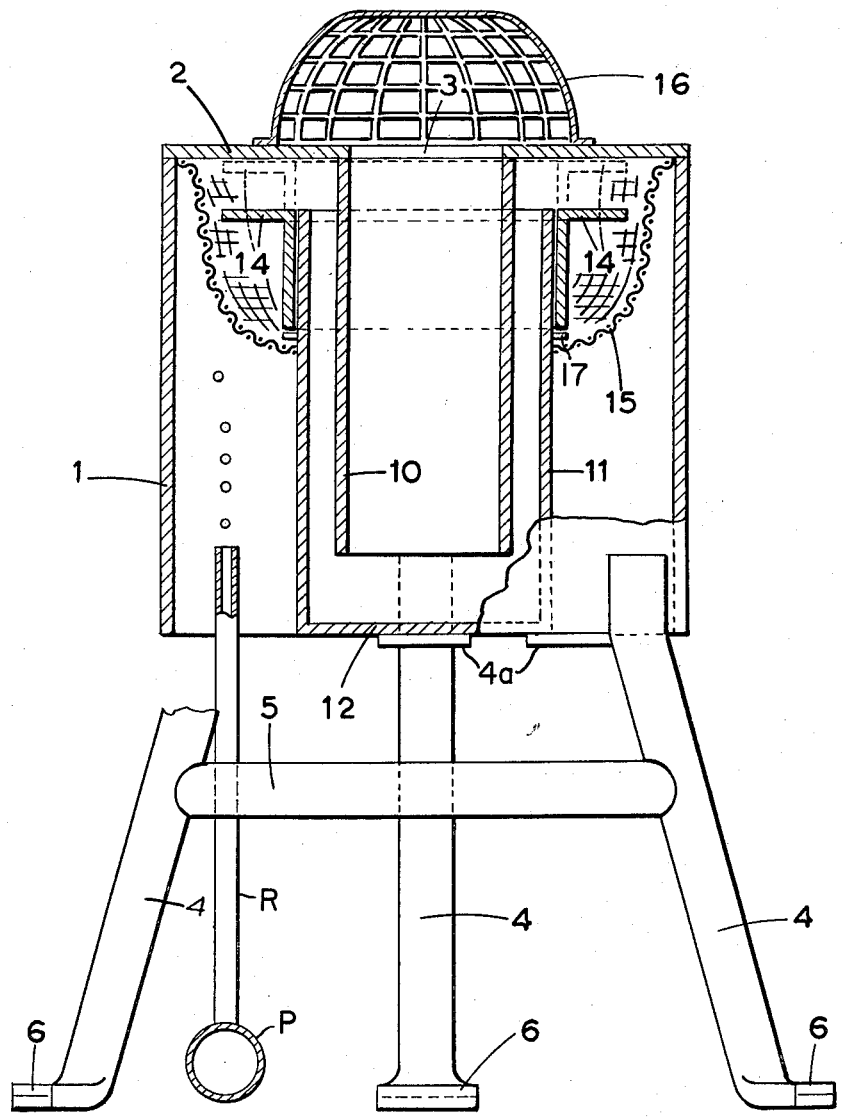
Inventor
ALEC HIBBURD LAURIE
by Shoemaker + Mattare
Attorneys

2,967,399
Patented Jan. 10, 1961

---

2,967,399
ARTIFICIAL BREAKWATERS

Alec Hibburd Laurie, London, England, assignor to Pneumatic Breakwaters Limited, London, England, a body corporate of Great Britain Filed July 12, 1957, Ser. No. 671,642

9 Claims. (Cl. 61—6)

This invention relates to artificial breakwaters that is to say to devices for reducing sea waves and swell by interposing air or other bubbles in the path of wave motion.

Air or other fluid bubbles are considered to be effective for this purpose only insofar as they create gross discontinuities in the water, in the form of eddies whose velocity and magnitude are of the same order as that of the movements of water in orbital motion, in order to create such conditions in the water it is necessary to generate large bubbles, that is to say bubbles substantially larger than are formed in liquid at an air nozzle through which air is being discharged continuously.

In the present invention the basic ingredients of an artificial or pneumatic breakwater are as follows: A supply of air or other fluid from a compressor or other available source is conveyed say to the sea bottom through a corrosion resisting pipe of suitable bore. This pipe is fitted with adjustable valves spaced some appropriate distance say three feet apart. The function of these valves is to provide, at the specified intervals an air or fluid discharge which is controllable and preferably constant for each outlet, notwithstanding the effects of pressure drop in the length of pipe, or differences in hydrostatic pressure caused by variations in the contour of the sea bottom. The valves terminate in jets or outlets which project substantially vertically from the main pipe.

Over each of these jets is placed, on supporters, a container, vessel or can, of cylindrical, rectangular or other suitable cross section, a particular feature of which is that the upper end of the can is closed, while the lower end is open to the sea. The can is also fitted with a discharge pipe arranged in such a manner as to operate like an inverted siphon.

One of the objects of this invention is to provide means for reducing sea waves and swell by introducing air or other gas into the water.

A further object of the invention is to introduce the air in the form of large bubbles.

A further object is to introduce the large bubbles in a cyclic manner so as to create gross discontinuities therein and thereby reduce the wave and swell action of the water.

It is still a further object to carry out the above objects in an expeditious manner using equipment which is simple to construct and not likely to become inoperative from the elements or become fouled by seaweed or small fish in the vicinity of the apparatus.

With the above and other objects in view, reference is made to the accompanying drawing in which Fig. 1 is a view of the invention partly in vertical section and partly in front elevation.

In carrying out this invention, there is provided a circular cylindrical container 1 formed of polyethylene or other suitable material. The container 1 is open at the bottom and closed at the top 2 except for a central aperture 3.

Mounted in the aperture 3 is a depending tube 10 which is provided with an open bottom. Surrounding tube 10 is a slightly larger tube 11 which has a closed bottom 12, the open end of the tube 11 being spaced from the closed top 2 of container 1 a suitable distance so that the container 1 and associated depending tube 10 along with the tube 11 constitute a siphon.

Slidable on and surrounding the upper end of tube 11 is a flanged ring or valve 14 which preferably is formed of buoyant material and functions in a manner to be disclosed.

The container 1 is supported preferably on four legs 4 by means of suitable brackets 4a which are welded or otherwise affixed to the legs 4, although the container 1 may be supported by bolts extending through the legs 4 and container 1 if desired or by any other suitable means. The legs 4 are rigidized by suitable bracing bars 5 and have feet 6 so as to enable the unit to stand on the ocean floor.

Air or other gas is fed to the container 1 by means of a pipe line or header P which runs along the sea bed from a source of constant supply not shown. The pipe line P is provided with a riser R to each of the containers preferably leading into the open bottom thereof. As regards the main air supply, each container is supplied with compressed air or other gas, in one of two ways, according to circumstances; either a jet of appropriate caliber projects into the casing from a main supply pipe, or each container is supplied individually from the compressor by a small gauge pipe, whose air delivery can be controlled.

The breakwater when first submerged so as to rest on the ocean floor fills completely with water. As air or other gas is forced through the pipe P and riser R the air escapes out into the upper end of the container 1. The buoyant valve 14 initially floats to its uppermost position where it engages the under side of the container as shown by dotted lines and serves to seal the container 1 and prevent leakage of the incoming air through discharge tube 10. As the water in container 1 is displaced below the grid 15 by the incoming air the float valve will descend onto the stops 17 above grid 15 where it will remain until the air is discharged from the container through outlet 3 and water again fills the container.

As the water level continues to drop, owing to the displacement by air, to the level of the bottom of the air delivery tube, some air starts to escape up the tube, entraining the water therein, and almost immediately there ensues a sharp discharge, of all the air in the main casing. The air in the main casing is driven out through the closed cylinder, and thence through the air delivery tube by the pressure differential of the water inside and outside the casing and is immediately replaced by sea water which enters through the open bottom of the casing. Since the air supply to the casing is continuous, the cycle described above repeats itself with a frequency which is proportional to the rate of air feed. The intermittent discharge of air emerges from the delivery tube in the form of large bubbles which are then free to find their way to the sea surface, and in so doing, to bring about a state of random turbulence in the water. The provision of a concentric pair of tubes, viz., the air delivery tube and the cylinder capped at the bottom are a convenient practical substitute for a U-tube. The distributor described above serves to discharge intermittently a larger volume of air during a short period of time. Ideally each discharge should take the form of a single large bubble, though in practice this seldom happens. As an aid to the formation of the maximum size of bubbles at each discharge, provision is also made for the injection into the main air line or lines of an aqueous solution of a suitable surface active agent, which, traveling down the air line in the form of a mist, alters the tension in the water immediately above the air delivery tube and assists in the formation of larger bubbles.

While the valve is not necessary to the function of the device since the incoming air will automatically displace the water in container 1 and any water between the space defined by the exterior wall of tube 10 and the exterior wall of tube 11, a more effective air discharge occupying a shorter time interval is secured when the valve is used in the apparatus. If the discharging action is prevented from completion, that is, if the air discharge is stopped at the point where the water level in the casing reaches the top of the closed bottom tube and water is prevented from flooding the concentric tubes from inside the container, such as by using a floating valve, the cyclic action will be carried out at a faster rate than if no valve were used since the valve prevents the partial escape of some of the incoming air during the filling portion of the cycle.

A grille 16 is mounted on the exterior of the container to effectively prevent ingress of seaweed and small fish into exit tube 10 which might clog the apparatus.

While the invention has been described with respect to the presently preferred embodiment which has been found entirely satisfactory, it will be understood by those skilled in the art after understanding the invention that various changes and modifications may be made without departing from the scope of the appended claims.

What I claim is:

1. A pneumatic breakwater comprising in combination, an upright hollow container having an open bottom and a closed top, an aperture formed through said top, a tube supported within said container and fixed to said top and enclosing said aperture, a tubular member supported within said container in surrounding relation to said tube and spaced therefrom, said tubular member having a closed bottom and an open top spaced from the top of the container, and means for introducing gas into the open bottom of said container whereby bubbles of gas are cyclically released through said tube.

2. Apparatus as defined in claim 1 including a protective grid supported within said container in surrounding relationship to said tubular member and in engagement with the outer surface of said tubular member and the inner surface of said container for preventing entrance of undesired foreign matter into said tubular member.

3. Apparatus as defined in claim 1 including a protective grid in engagement with said container and disposed in overlying relationship to said aperture in the top of the container for preventing entrance of undesired foreign matter into said container.

4. Apparatus as defined in claim 1 including a flanged sleeve valve slidably mounted about the outer surface of said tubular member and operative under predetermined conditions to obturate the space between the upper end of the tubular member and the top of the container to temporarily suspend action of the apparatus.

5. A pneumatic breakwater operated by the supply of gas which comprises an upstanding substantially cylindrical container having a side wall, an open bottom and a closed top, a central aperture formed through the closed end of said container, means for introducing gas into said container, a first tubular member within said container depending from said closed end of the container and disposed in surrounding relationship to said aperture, a second tubular member having a closed end and an open end, said second tubular member being disposed in surrounding relationship to said first tubular member and positioned between said first tubular member and the side wall of said container, the closed end of said second tubular member being disposed downwardly of the lower end of said first tubular member, the open end of said second tubular member being disposed downwardly of said closed end of the container, and a substantially annular sleeve valve having a laterally extending flange formed therearound at the upper portion thereof, said sleeve valve being disposed in surrounding relationship to said second tubular member and being adapted for movement upwardly in said container into engagement with the undersurface of the closed end of the container for temporarily suspending the action of the apparatus.

6. Apparatus as defined in claim 5 including a protective grid having upper and lower end portions, the upper end portion being connected to said container and the lower end portion being connected to the outer surface of said second tubular member below said sleeve valve, whereby said protective grid prevents entrance of undesired foreign matter into the interior of said second tubular member.

7. Apparatus as defined in claim 5 including a protective grid having the outer periphery thereof secured to the closed end of said container in overlying relationship to the aperture formed through said closed end of the container for preventing entrance of undesired foreign matter into said container.

8. A breakwater device adapted to be disposed in submerged condition beneath the surface of a body of water, said breakwater comprising a container and support means rigid with the container for positioning the same in a vertical position, the bottom of said container being open and there being an opening in the top of the container, means for continuously introducing a gas into the container through the open bottom thereof, a gas delivery tube fixed to said container and disposed therewithin, said gas delivery tube being disposed in vertical position and being open at its opposite ends, the upper end of said gas delivery tube being registered with the opening in the top of said container and the lower end of said gas delivery tube being at a level within the container higher than the open bottom of the latter, a secondary tube fixed within said container in surrounding relationship to a major portion of said gas delivery tube, said secondary tube being vertically disposed and having a closed bottom spaced below the lower end of said gas delivery tube and having an open top spaced below the top of said container, said means for introducing gas into said container comprising a perforated tube disposed between said container wall and said secondary tube.

9. A breakwater device adapted to be disopsed in submerged condition beneath the surface of a body of water, said breakwater comprising a container and support means rigid with the container for positioning the same in a vertical position, the bottom of said container being open and there being an opening in the top of the container, means for continuously introducing a gas into the container through the open bottom thereof, a gas delivery tube fixed to said container and disposed therewithin, said gas delivery tube being disposed in vertical position and being open at its opposite ends, the upper end of said gas delivery tube being registered with the opening in the top of said container and the lower end of said gas delivery tube being at a level within the container higher than the open bottom of the latter, a secondary tube fixed within said container in surrounding relationship to a major portion of said gas delivery tube, said secondary tube being vertically disposed and having a closed bottom spaced below the lower end of said gas delivery tube and having an open top spaced below the top of said container, a buoyant sleeve surrounding the upper end of said secondary tube and axially movable relative thereto between a position spaced below the upper end of said container and a position engaging the upper end of the container.

References Cited in the file of this patent

UNITED STATES PATENTS

| | | |
|---|---|---|
| 181,569 | Field | Aug. 29, 1876 |
| 471,418 | Clark | Mar. 22, 1892 |
| 1,226,758 | Dufty | May 22, 1917 |
| 1,593,863 | Brasher | July 27, 1926 |